United States Patent [19]

Nishino et al.

[11] Patent Number: 5,268,755
[45] Date of Patent: Dec. 7, 1993

[54] ORTHOGONAL TRANSFORMATION ENCODER

[75] Inventors: Masakazu Nishino, Kashiwara; Tatsuro Juri, Osaka; Hiroshi Horikane, Kadoma; Iwao Hidaka, Higashiosaka, all of Japan

[73] Assignee: Matsushita Electric Industrial Co., Ltd., Osaka, Japan

[21] Appl. No.: 835,600

[22] Filed: Feb. 14, 1992

[30] Foreign Application Priority Data

Feb. 21, 1991 [JP] Japan .................. 3-027284
Feb. 26, 1991 [JP] Japan .................. 3-030562

[51] Int. Cl.$^5$ ............................................ H04N 7/133
[52] U.S. Cl. .................... 358/136; 358/105; 358/133
[58] Field of Search .............. 358/105, 133, 135, 136; 364/725

[56] References Cited

U.S. PATENT DOCUMENTS

5,091,782 2/1992 Krause .................. 358/105

Primary Examiner—Howard W. Britton
Attorney, Agent, or Firm—Stevens, Davis, Miller & Mosher

[57] ABSTRACT

Disclosed is an orthogonal transformation encoder in which after horizontal orthogonal transformation is performed, in parallel to the horizontal and vertical rearrangement of the coefficients for performing vertical orthogonal transformation, detection of interfield coefficient is performed and intra-frame/intrafield modes for the vertical orthogonal transformation are switched. Further, in parallel to the rearrangement of the transformation coefficients for the vertical orthogonal transformation to be in the ascending order from a lower frequency component to a higher frequency component, the amplitude values of the AC components in the block in question are detected to thereby make control on the basis of the amplitude values so that the smaller the amplitude value of the block the smaller the quantizing step width.

6 Claims, 11 Drawing Sheets

A → HORIZONTAL

| $x_{11}$ | $x_{12}$ | $x_{13}$ | $x_{14}$ | $x_{15}$ | $x_{16}$ | $x_{17}$ | $x_{18}$ |
|---|---|---|---|---|---|---|---|
| $x_{21}$ | $x_{22}$ | $x_{23}$ | $x_{24}$ | $x_{25}$ | $x_{26}$ | $x_{27}$ | $x_{28}$ |
| $x_{31}$ | $x_{32}$ | $x_{33}$ | $x_{34}$ | $x_{35}$ | $x_{36}$ | $x_{37}$ | $x_{38}$ |
| $x_{41}$ | $x_{42}$ | $x_{43}$ | $x_{44}$ | $x_{45}$ | $x_{46}$ | $x_{47}$ | $x_{48}$ |
| $x_{51}$ | $x_{52}$ | $x_{53}$ | $x_{54}$ | $x_{55}$ | $x_{56}$ | $x_{57}$ | $x_{58}$ |
| $x_{61}$ | $x_{62}$ | $x_{63}$ | $x_{64}$ | $x_{65}$ | $x_{66}$ | $x_{67}$ | $x_{68}$ |
| $x_{71}$ | $x_{72}$ | $x_{73}$ | $x_{74}$ | $x_{75}$ | $x_{76}$ | $x_{77}$ | $x_{78}$ |
| $x_{81}$ | $x_{82}$ | $x_{83}$ | $x_{84}$ | $x_{85}$ | $x_{86}$ | $x_{87}$ | $x_{88}$ |

VERTICAL ↓

B → HORIZONTAL

| $y_{11}$ | $y_{12}$ | $y_{13}$ | $y_{14}$ | $y_{15}$ | $y_{16}$ | $y_{17}$ | $y_{18}$ |
|---|---|---|---|---|---|---|---|
| $y_{21}$ | $y_{22}$ | $y_{23}$ | $y_{24}$ | $y_{25}$ | $y_{26}$ | $y_{27}$ | $y_{28}$ |
| $y_{31}$ | $y_{32}$ | $y_{33}$ | $y_{34}$ | $y_{35}$ | $y_{36}$ | $y_{37}$ | $y_{38}$ |
| $y_{41}$ | $y_{42}$ | $y_{43}$ | $y_{44}$ | $y_{45}$ | $y_{46}$ | $y_{47}$ | $y_{48}$ |
| $y_{51}$ | $y_{52}$ | $y_{53}$ | $y_{54}$ | $y_{55}$ | $y_{56}$ | $y_{57}$ | $y_{58}$ |
| $y_{61}$ | $y_{62}$ | $y_{63}$ | $y_{64}$ | $y_{65}$ | $y_{66}$ | $y_{67}$ | $y_{68}$ |
| $y_{71}$ | $y_{72}$ | $y_{73}$ | $y_{74}$ | $y_{75}$ | $y_{76}$ | $y_{77}$ | $y_{78}$ |
| $y_{81}$ | $y_{82}$ | $y_{83}$ | $y_{84}$ | $y_{85}$ | $y_{86}$ | $y_{87}$ | $y_{88}$ |

VERTICAL ↓

F I G. 3B

C — VERTICAL →

| $y_{11}$ | $y_{21}$ | $y_{31}$ | $y_{41}$ | $y_{51}$ | $y_{61}$ | $y_{71}$ | $y_{81}$ |
|---|---|---|---|---|---|---|---|
| $y_{12}$ | $y_{22}$ | $y_{32}$ | $y_{42}$ | $y_{52}$ | $y_{62}$ | $y_{72}$ | $y_{82}$ |
| $y_{13}$ | $y_{23}$ | $y_{33}$ | $y_{43}$ | $y_{53}$ | $y_{63}$ | $y_{73}$ | $y_{83}$ |
| $y_{14}$ | $y_{24}$ | $y_{34}$ | $y_{44}$ | $y_{54}$ | $y_{64}$ | $y_{74}$ | $y_{84}$ |
| $y_{15}$ | $y_{25}$ | $y_{35}$ | $y_{45}$ | $y_{55}$ | $y_{65}$ | $y_{75}$ | $y_{85}$ |
| $y_{16}$ | $y_{26}$ | $y_{36}$ | $y_{46}$ | $y_{56}$ | $y_{66}$ | $y_{76}$ | $y_{86}$ |
| $y_{17}$ | $y_{27}$ | $y_{37}$ | $y_{47}$ | $y_{57}$ | $y_{67}$ | $y_{77}$ | $y_{87}$ |
| $y_{18}$ | $y_{28}$ | $y_{38}$ | $y_{48}$ | $y_{58}$ | $y_{68}$ | $y_{78}$ | $y_{88}$ |

↓ HORIZONTAL

D — VERTICAL →

| $z_{11}$ | $z_{21}$ | $z_{31}$ | $z_{41}$ | $z_{51}$ | $z_{61}$ | $z_{71}$ | $z_{81}$ |
|---|---|---|---|---|---|---|---|
| $z_{12}$ | $z_{22}$ | $z_{32}$ | $z_{42}$ | $z_{52}$ | $z_{62}$ | $z_{72}$ | $z_{82}$ |
| $z_{13}$ | $z_{23}$ | $z_{33}$ | $z_{43}$ | $z_{53}$ | $z_{63}$ | $z_{73}$ | $z_{83}$ |
| $z_{14}$ | $z_{24}$ | $z_{34}$ | $z_{44}$ | $z_{54}$ | $z_{64}$ | $z_{74}$ | $z_{84}$ |
| $z_{15}$ | $z_{25}$ | $z_{35}$ | $z_{45}$ | $z_{55}$ | $z_{65}$ | $z_{75}$ | $z_{85}$ |
| $z_{16}$ | $z_{26}$ | $z_{36}$ | $z_{46}$ | $z_{56}$ | $z_{66}$ | $z_{76}$ | $z_{86}$ |
| $z_{17}$ | $z_{27}$ | $z_{37}$ | $z_{47}$ | $z_{57}$ | $z_{67}$ | $z_{77}$ | $z_{87}$ |
| $z_{18}$ | $z_{28}$ | $z_{38}$ | $z_{48}$ | $z_{58}$ | $z_{67}$ | $z_{78}$ | $z_{88}$ |

↓ HORIZONTAL

FIG. 3C

C'  →VERTICAL

| $y_{11}$ | $y_{31}$ | $y_{51}$ | $y_{71}$ | $y_{81}$ | $y_{61}$ | $y_{41}$ | $y_{21}$ |
|---|---|---|---|---|---|---|---|
| $y_{12}$ | $y_{32}$ | $y_{52}$ | $y_{72}$ | $y_{82}$ | $y_{62}$ | $y_{42}$ | $y_{22}$ |
| $y_{13}$ | $y_{33}$ | $y_{53}$ | $y_{73}$ | $y_{83}$ | $y_{63}$ | $y_{43}$ | $y_{23}$ |
| $y_{14}$ | $y_{34}$ | $y_{54}$ | $y_{74}$ | $y_{84}$ | $y_{64}$ | $y_{44}$ | $y_{24}$ |
| $y_{15}$ | $y_{35}$ | $y_{55}$ | $y_{75}$ | $y_{85}$ | $y_{65}$ | $y_{45}$ | $y_{25}$ |
| $y_{16}$ | $y_{36}$ | $y_{56}$ | $y_{76}$ | $y_{86}$ | $y_{66}$ | $y_{46}$ | $y_{26}$ |
| $y_{17}$ | $y_{37}$ | $y_{57}$ | $y_{77}$ | $y_{87}$ | $y_{67}$ | $y_{47}$ | $y_{27}$ |
| $y_{18}$ | $y_{38}$ | $y_{58}$ | $y_{78}$ | $y_{88}$ | $y_{68}$ | $y_{48}$ | $y_{28}$ |

↓ HORIZONTAL

D'  →VERTICAL

| $z_{11}$ | $z_{31}$ | $z_{21}$ | $z_{41}$ | $z_{51}$ | $z_{71}$ | $z_{61}$ | $z_{81}$ |
|---|---|---|---|---|---|---|---|
| $z_{12}$ | $z_{32}$ | $z_{22}$ | $z_{42}$ | $z_{52}$ | $z_{72}$ | $z_{62}$ | $z_{82}$ |
| $z_{13}$ | $z_{33}$ | $z_{23}$ | $z_{43}$ | $z_{53}$ | $z_{73}$ | $z_{63}$ | $z_{83}$ |
| $z_{14}$ | $z_{34}$ | $z_{24}$ | $z_{44}$ | $z_{54}$ | $z_{74}$ | $z_{64}$ | $z_{84}$ |
| $z_{15}$ | $z_{35}$ | $z_{25}$ | $z_{45}$ | $z_{55}$ | $z_{75}$ | $z_{65}$ | $z_{85}$ |
| $z_{16}$ | $z_{36}$ | $z_{26}$ | $z_{46}$ | $z_{56}$ | $z_{76}$ | $z_{66}$ | $z_{86}$ |
| $z_{17}$ | $z_{37}$ | $z_{27}$ | $z_{47}$ | $z_{57}$ | $z_{77}$ | $z_{67}$ | $z_{87}$ |
| $z_{18}$ | $z_{38}$ | $z_{28}$ | $z_{48}$ | $z_{58}$ | $z_{78}$ | $z_{68}$ | $z_{88}$ |

↓ HORIZONTAL

FIG. 4

E → VERTICAL

| 1 | 3 | 4 | 10 | 11 | 21 | 22 | 36 |
|---|---|---|----|----|----|----|----|
| 2 | 5 | 9 | 12 | 20 | 23 | 35 | 37 |
| 6 | 8 | 13 | 19 | 24 | 34 | 38 | 49 |
| 7 | 14 | 18 | 25 | 33 | 39 | 48 | 50 |
| 15 | 17 | 26 | 32 | 40 | 47 | 51 | 58 |
| 16 | 27 | 31 | 41 | 46 | 52 | 57 | 59 |
| 28 | 30 | 42 | 45 | 53 | 56 | 60 | 63 |
| 29 | 43 | 44 | 54 | 55 | 62 | 63 | 64 |

HORIZONTAL ↓

E → VERTICAL →

| 1 | 5 | 11 | 13 | 2 | 6 | 12 | 14 |
|---|---|----|----|---|---|----|----|
| 3 | 9 | 15 | 27 | 4 | 10 | 16 | 28 |
| 7 | 17 | 25 | 29 | 8 | 18 | 26 | 30 |
| 19 | 23 | 31 | 43 | 20 | 24 | 32 | 44 |
| 21 | 33 | 41 | 45 | 22 | 34 | 42 | 46 |
| 35 | 39 | 47 | 57 | 36 | 40 | 48 | 58 |
| 37 | 49 | 55 | 59 | 38 | 50 | 56 | 60 |
| 51 | 53 | 61 | 63 | 52 | 54 | 62 | 64 |

HORIZONTAL ↓

INTER-FIELD SUM | INTER-FIELD DIFFERENCE

ORTHOGONAL TRANSFORMATION ENCODER

BACKGROUND OF THE INVENTION

1. Field of the Invention

The present invention relates to an orthogonal transformation encoder to be used for making the compression ratio in the case of high-efficiency coding of a video signal.

2. Description of the Related Art

The bit rate reduction technology (or high-efficiency coding technology) for reducing the data quantity of an original video signal for the purpose of long hour picture recording is used to constitute a recording/reproducing apparatus (for example, a VTR, a video disc, etc.) for recording/reproducing a video signal. The orthogonal transformation coding is a process in which a video signal is divided into blocks and frequency analysis is performed on every block, so that the quantity of data to be transmitted (or to be recorded) is made smaller as the frequency of components is higher. That is, a visual character is utilized such that it is more difficult to detect deterioration as the frequency of components is higher.

Figure 1:
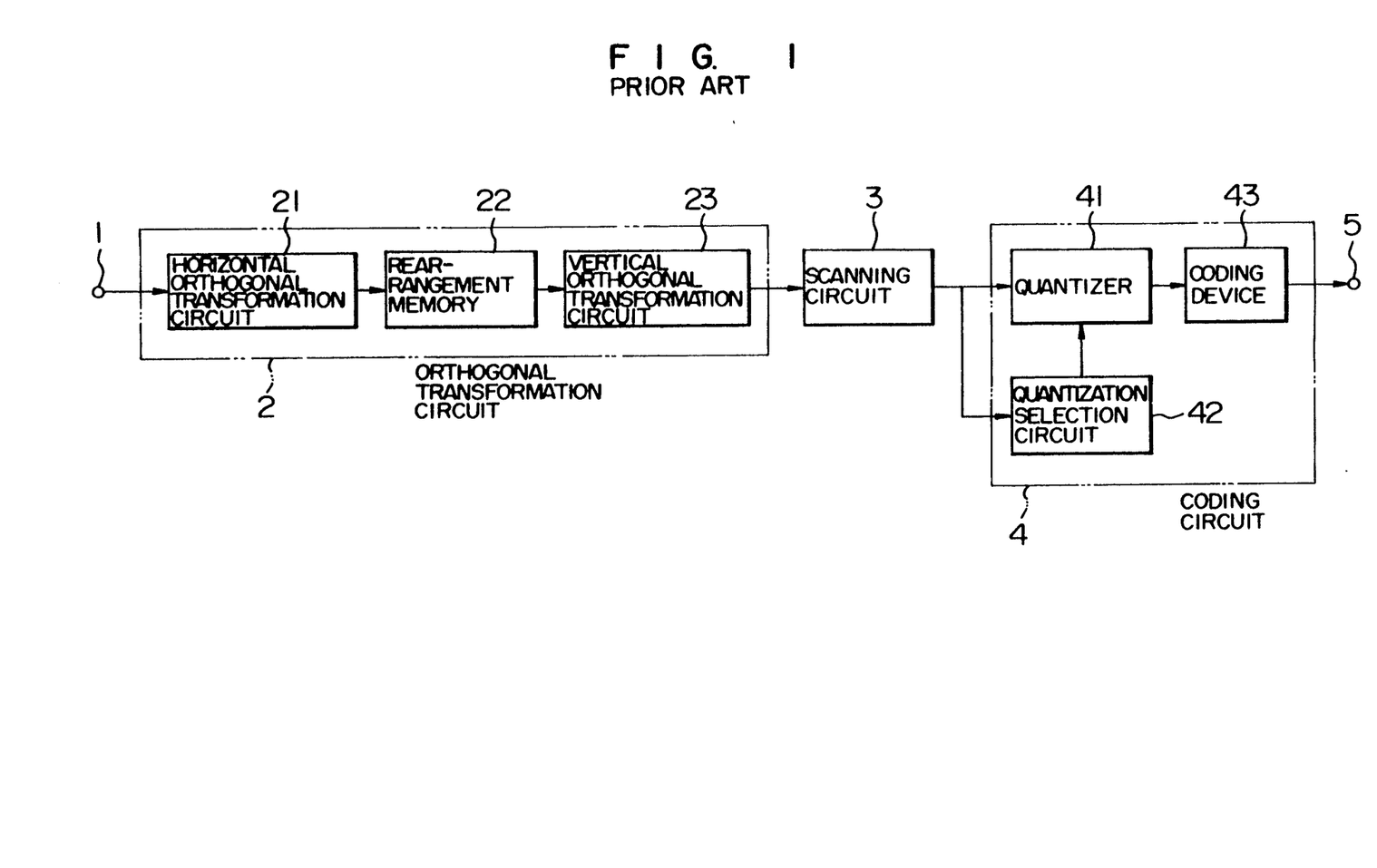
FIG. 1 is a block diagram of a conventional orthogonal transformation encoder.

FIG. 1 is a block diagram showing a conventional orthogonal transformation encoder for performing such orthogonal transformation coding. The operation of the orthogonal transformation encoder will be described hereunder.

The conventional orthogonal transformation encoder is constituted by: a conventional input terminal 1 for receiving a blocking signal of a video signal; an orthogonal transformation circuit 2 for two-dimensionally transforming the blocking signal; a scanning circuit 3 for performing rearrangement of the orthogonal transformation coefficients obtained from the orthogonal transformation circuit 2; a coding circuit 4 for coding the orthogonal transformation coefficients outputted from the scanning circuit 3; and an output terminal 5.

The orthogonal transformation circuit 2 is constituted by a horizontal orthogonal transformation circuit 21 for performing orthogonal transformation in the horizontal direction; a rearrangement memory 22 for rearranging the horizontally arranged coefficients of the orthogonal transformation into the vertical direction; and a vertical orthogonal transformation circuit 23 for performing orthogonal transformation in the vertical direction.

The coding circuit 4 is constituted by a quantizer 41 for quantizing, with a given step width, the coefficients of the orthogonal transformation, a quantization selection circuit 42 for selecting so that the quantizer has a step width suitable for arranging a data quantity to be a desired value, and a coding device 43 for coding the quantized data outputted from the quantizer 41.

With respect to the frequency of occurrence of a coded word, the coding device 43 performs variable length coding for assigning a coded word which is made shorter in length (smaller in data quantity) as the frequency of occurrence of the coded word is higher. Accordingly, the quantization selection circuit 42 calculates the data quantity to be obtained as a result of the variable length coding to whereby make a selection so that the quantizer has an optimum step width.

For the coding for two-dimensional orthogonal transformation, two-dimensional arrangement from low frequency components to high frequency components, called zigzag scanning, is preferable. That is, the lower frequency components are made more important than the higher frequency components because the lower frequency components give a visual influence greater than that of the higher frequency components. To this end, in the coding circuit 4, the step width is made finer successively starting from a condition where the quantization is performed with the most largest step width to a condition where the data quantity is made to be a desired value.

The above-mentioned construction has the following problems.

A first problem is that in the orthogonal transformation circuit 2, it is possible to perform the orthogonal transformation only by frame in the case a video signal to be subjected to the orthogonal transformation is transmitted by frame. That is, when a video signal which moves between fields is inputted, intra-frame two-dimensional orthogonal transformation is performed regardless of a large field correlation. Accordingly, intra-field moving components appear in the high frequency components in the vertical direction on the orthogonal transformation coefficients to thereby extremely impair the data quantity reducing efficiency.

A second problem exists in that in the encoding circuit 4, the same quantization selection is made evenly to a signal block which contains only small-amplitude frequency components and a signal block which contains large-amplitude frequency components.

In view of the data quantity through coding, signal blocks may be classified into two kinds of blocks. That is, blocks of a large data quantity include blocks containing large-amplitude frequency components and blocks of a small data quantity include blocks containing only small-amplitude frequency components. If the same step width is assigned to those two kinds of blocks, the blocks containing large-amplitude frequency components are not deleted even by the large step width because of the large amplitude thereof. On the other hand, most of the coefficients of the later blocks containing only small-amplitude frequency components is deleted (that is, the coefficients are assigned to "0"). This means that with respect to blocks having important information though they are blocks on a flat picture screen, the important information is lost (remarkably, for example, in the trees and plants or sky in the background).

SUMMARY OF THE INVENTION

It is therefore an object to solve the above problems in the conventional cases.

It is another object to provide an orthogonal transformation encoder in which intra-frame and intra-field orthogonal transformation can be performed without so much expanding an orthogonal transformation circuit, and in which inter-block data quantity control is facilitated, and in which an increase in circuit is much less.

In order to attain the above objects, according to an aspect of the present invention, the orthogonal transformation encoder comprises: a first orthogonal transformation circuit supplied with a blocking signal of a video signal by frame, and for performing orthogonal transformation on the blocking signal in the horizontal direction; an inter-field correlation detection circuit provided in parallel to the first orthogonal transformation circuit, and for detecting correlation between two fields included in the blocking signal; a rearrangement memory for rearranging an output of the first orthogonal transformation circuit, in the vertical direction; a second orthogonal transformation circuit for performing orthogonal transformation, in the vertical direction, on the output blocking signal from the rearrangement memory; and wherein intra-frame orthogonal transformation is performed by means of the rearrangement memory and the second orthogonal transformation circuit when the inter-field correlation detection circuit detects that the blocking signal has large inter-field correlation, while intra-field orthogonal transformation is performed by means of the rearrangement memory and the second orthogonal transformation circuit when the inter-field correlation detection circuit detects that the blocking signal has small inter-field correlation.

By the above construction, the detection of the interfield correlation by block is carried out in parallel to the orthogonal transformation in the horizontal direction, so that the output of the rearrangement memory in the stage before the orthogonal transformation in the vertical direction can be rearranged to have a coefficient arrangement for performing the intra-frame/intra-field orthogonal transformation in the vertical direction to thereby make it possible to perform intra-frame/intra-field orthogonal transformation without increasing the circuit scale.

According to another aspect of the present invention, the orthogonal transformation encoder for orthogonally transforming and coding a video signal, comprises: a scanning means for rearranging orthogonally transformed transformation coefficients so as to be suitable for coding; an amplitude detection means provided in parallel to the scanning means, and for detecting amplitude values of the transformation coefficients; and a coding means for quantizing and coding the transformation coefficients obtained from the scanning means on the basis of amplitude information obtained from the amplitude detection means.

By the above construction, it is possible to obtain the maximum value per se of the coefficient corresponding to the maximum amplitude of the frequency components contained in each block or the result of classification of the amplitudes, so that the amplitudes of the frequency components of each block can be easily found at the coding in the succeeding stage and data quantity control can be performed without eliminating frequency components which are important regardless of their small amplitudes. Further, the maximum value or maximum class of the frequency components is obtained in parallel to the operation of the rearrangement circuit, so that no additional memory for the detection of the above maximum value or class is required.

DESCRIPTION OF THE PREFERRED EMBODIMENTS

Figure 2:
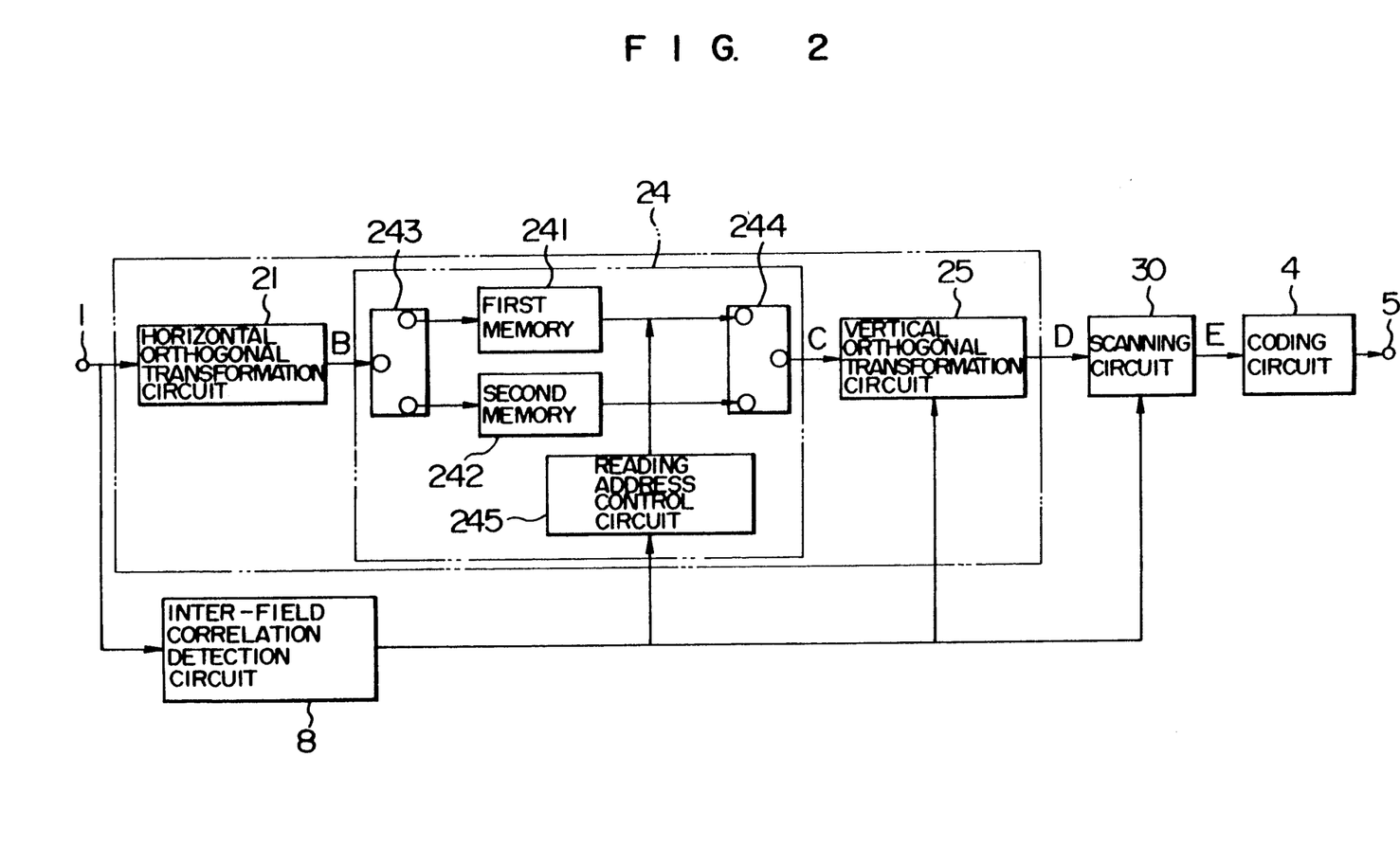
FIG. 2 is a block diagram showing the configuration of the orthogonal transformation encoder according to a first embodiment of the present invention.

FIG. 2 is a block diagram showing an embodiment of the orthogonal transformation encoder according to the present invention. In the drawing, an input terminal 1, a horizontal orthogonal transformation circuit 21 for performing horizontal orthogonal transformation, a coding circuit 4, and an output terminal 5 have the same configurations as those of the conventional orthogonal transformation encoder, and those constituent components are therefore referenced correspondingly. This embodiment is different from the conventional example in the combination of a rearrangement memory 24, a vertical orthogonal transformation circuit 25 for performing vertical orthogonal transformation, and a scanning circuit 30, and in the additional provision of an interfield correlation detection circuit 8.

Figure 3A:
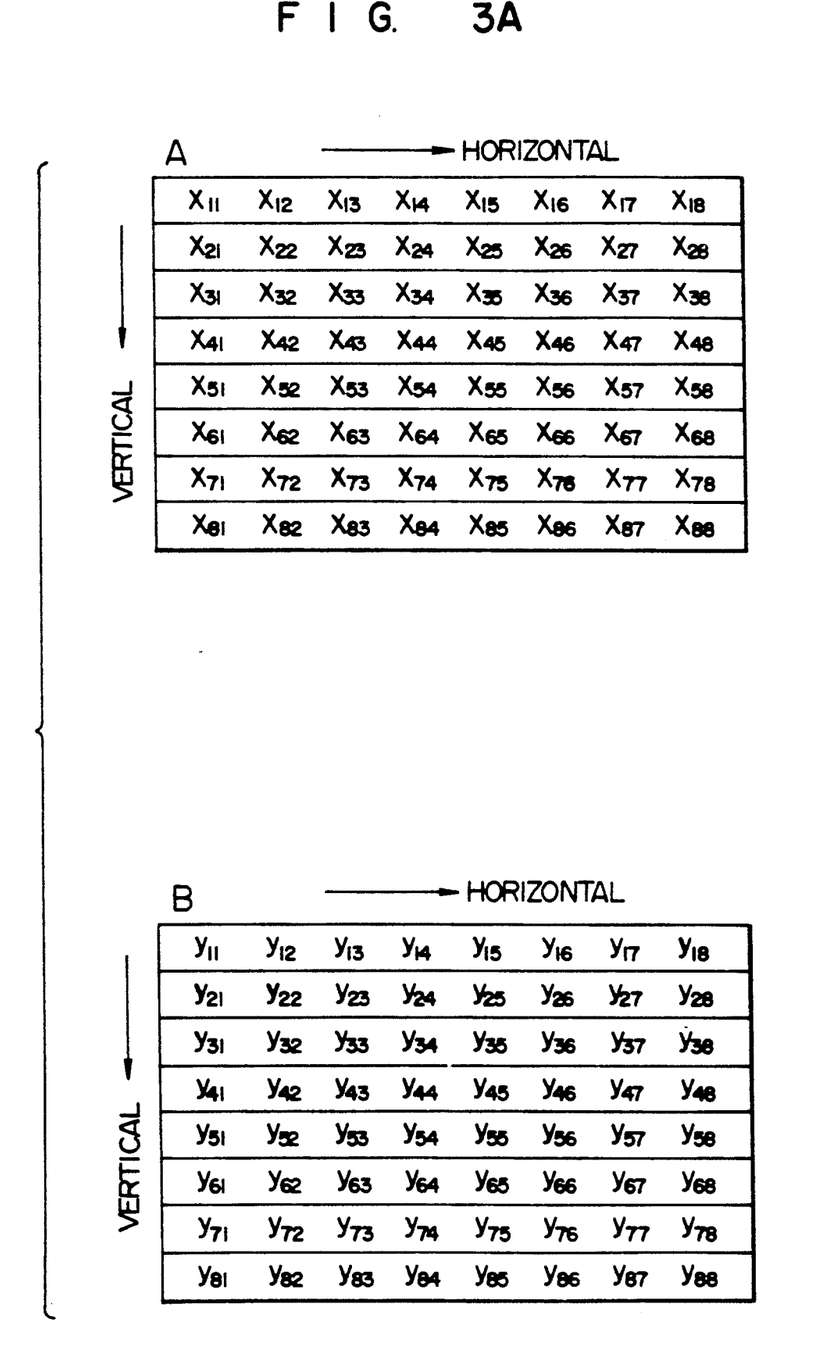
FIGS. 3A-C and 4 are views of signal arrangements among the constituent components for explaining the operation of the orthogonal transformation encoder according to the first embodiment of the present invention.
Figure 3B:
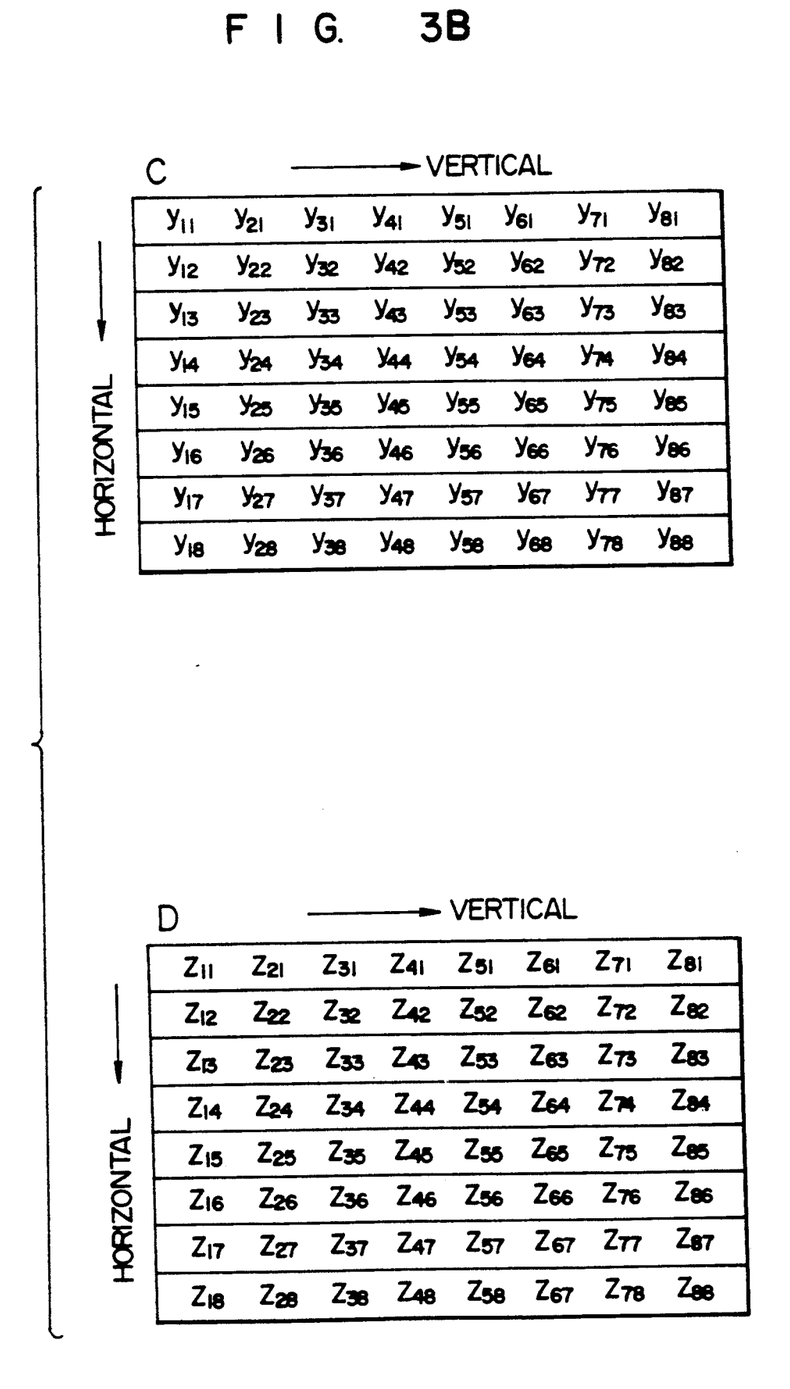
Figure 3C:
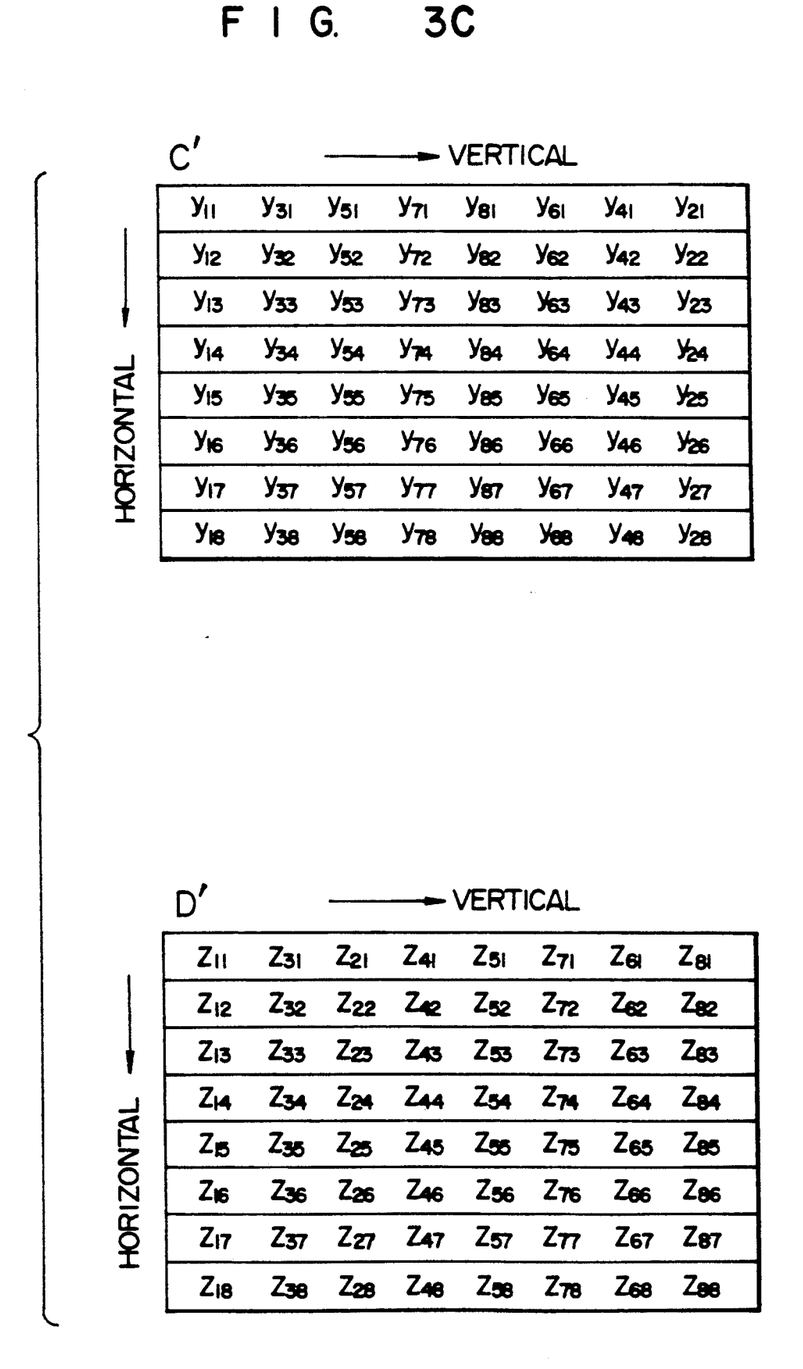

Next, the operation of this embodiment will be described with reference to FIGS. 3A-C showing signals among the constituent components of FIG. 2.

In FIG. 3A, "A" shows a blocking signal for one block of a video signal supplied through the input terminal 1. In the drawing, $X_{ij}$ represents the respective pixels of the blocking signal, and the subscript i ($=1, \ldots, 8$) represents a vertical position of the pixel. the number continues from the upper portion to the lower portion of a scene. Further, the subscript j ($=1, \ldots, 8$) represents a horizontal position of the pixel and the number continues from the left to the right of the scene. This blocking signal A is a blocking signal for performing horizontal orthogonal transformation of degree 8 and vertical orthogonal transformation of degree 8, that is, two-dimensional orthogonal transformation of degree $8 \times 8$, by frame.

The horizontal orthogonal transformation circuit 21 receives the blocking signal A and produces a block signal B of FIG. 3A. Here, $y_{ij}$ in the block signal B represents horizontal orthogonal transformation coefficients, the subscript i representing the vertical arrangement similarly to the case of the blocking signal A. The subscript 1 continues from a low-frequency component to a high-frequency component corresponding to the frequency components obtained by the orthogonal transformation. The horizontal orthogonal transformation circuit 21 performs horizontal orthogonal transformation, that is, performs processing on the blocking signal A by 8 pixels of $x_{ij}$ (j$=1, \ldots, 8$), and repeats the processing by 8 times successively in the case of i$=1, \ldots, 8$ in the vertical direction.

The vertical orthogonal transformation circuit 25, on the other hand, performs processing on the block signal B by 8 coefficients of $y_{ij}$ (i=1, ..., 8) to thereby perform vertical orthogonal transformation on the block signal B. The input block signal B, however, has a horizontal arrangement of coefficients (8 horizontal coefficient units are arranged in the vertical direction) because of the horizontal orthogonal transformation circuit 21. Accordingly, the horizontal arrangement of coefficients is rearranged into a vertical arrangement of coefficients (8 vertical coefficient units are arranged in the horizontal direction) by means of the rearrangement memory 24. In the rearrangement memory 24, first and second memories 241 and 242 are operated through switches 243 and 244 so that when a present block signal B is written into one of the memories, a preceding block signal B which has been stored in the other memory is read from the other memory and led to the vertical orthogonal transformation circuit 25, that is, reading and writing can be alternately performed block by block. At this time, the rearrangement from the horizontal arrangement into the vertical one is performed by a reading address control circuit 245 so as to change $y_{ij}$ into $y_{ji}$ of the block signal B. (In FIG. 3B, one horizontal line in the drawing is expressed as one processing unit as shown in a block signal C). If the coefficient arrangement of the block signal C is realized, the vertical orthogonal transformation circuit 25 can be realized by the same configuration as that of the horizontal orthogonal transformation circuit 21. As a result, two-dimensional transformation coefficients shown in a block signal D of FIG. 3B are produced from the vertical orthogonal transformation circuit 25.

Since the block signal D of FIG. 3B has a vertical arrangement of coefficients, rearrangement, for example, zigzag scanning is performed in the scanning circuit 4 so that two-dimensional orthogonal transformation coefficients are arranged in the order from a two-dimensionally low frequency component to a two-dimensionally high frequency component, and the rearranged signal is sent to the coding circuit 4.

The intra-field correlation detection circuit 8 receives the blocking signal A (FIG. 3A) and detects inter-field correlation in parallel to the horizontal orthogonal transformation circuit 21. Simply, the inter-field correlation can be detected by calculation of a level difference between pixel values of the respective fields. For example, the blocking signal A is a signal obtained by non-interlacing a signal of two fields by pixel in the vertical direction, that is, by line, and therefore P obtained through the following expression represents the inter-field level difference.

$$P = \sum_{j=1}^{8} \sum_{k=1}^{4} |x2kj - x2k + 1j| \quad \text{[Equation 1]}$$

P takes a small value in the case of existence of inter-field correlation while it takes a large value in the case of existence of no inter-field correlation. Accordingly, intra-frame orthogonal transformation and intra-field orthogonal transformation can be switched on the basis of a predetermined threshold $P_o$, as follows.

[Expression 2]

In the case of $P \leq P_o$: intra-frame orthogonal transformation

In the case of $P > P_o$: intra-field orthogonal transformation

Here, the value of the threshold $P_o$ may be set to an optimum value by the compressing processing and coding in the succeeding stage.

The switching between the intra-field orthogonal transformation and the intra-frame orthogonal transformation is performed through the reading address control circuit 245 in the rearrangement memory 24, the vertical orthogonal transformation circuit 25, and the scanning circuit 30, on the basis of the result of detection of the intra-field correlation detection circuit 8. Next, the operations of the foregoing constituent components will be described. Here, the vertical orthogonal transformation circuit 25 operates in the same manner as the operation of "the orthogonal transformation apparatus" disclosed in Japanese Patent Application No. Hei-2-282119 filed by the Applicant of this application. "The orthogonal transformation apparatus" is a measure which uses high-speed operation algorithm to realize orthogonal transformation of degree 8 on a signal train ($y_{1i}$, $y_{2i}$, $y_{3i}$, ..., $y_{8i}$) in the block signal C (FIG. 3B) and orthogonal transformation of degree 4 on each of the sum and difference between two signals trains ($y_{1i}$, $y_{3i}$, $y_{5i}$, and $y_{7i}$) and ($y_{8i}$, $y_{6i}$, $y_{4i}$, and $y_{2i}$) in the block signal C on the basis of one switching control signal while using circuits commonly.

Accordingly, by using the above "orthogonal transformation apparatus" and by making the switching control signal be the output signal of the intra-field correlation detection circuit 8, orthogonal transformation of degree 8 is performed on a signal train ($y_{1i}$, $y_{2i}$, $y_{3i}$, ..., $y_{8i}$) when intra-frame orthogonal transformation is to be selected, and, on the other hand, orthogonal transformation for each of the sum and difference of degree 4 is performed on each of the sum and difference between two signal trains ($y_{1i}$, $y_{3i}$, $y_{5i}$, and $y_{7i}$) and ($y_{8i}$, $y_{6i}$, $y_{4i}$, and $y_{2i}$) when intra-field orthogonal transformation is to be selected.

Further, the "orthogonal transformation apparatus" has a rearrangement device as a constituent component in the forefront stage. The rearrangement device rearranges a signal train which has a predetermined arrangement and supplied to "the orthogonal transformation apparatus" so that a butterfly operator in the succeeding stage can be used commonly for the orthogonal transformation of degree 8 and the two orthogonal transformations of degree 4. In this embodiment, therefore, the rearrangement memory 24 is made to realize the rearrangement of a signal train which is performed in the above-mentioned rearrangement device so that the reararrangement memory 24 is used also as the rearrangement device in "the original transformation apparatus". To this end, the reading address control circuit 245 in the rearrangement memory 24 rearranges the horizontal arrangement of coefficients of the block signal B into the vertical arrangement of coefficients, and at the same time, rearranges, in accordance with the output of the intra-field correlation detection circuit 8, the 8 coefficient arrangements in the vertical direction so that the orthogonal transformation of degree 8 is performed when the intra-frame orthogonal transformation is to be selected and so that the two orthogonal transformations of degree 4 are performed when the intra-field orthogonal transformation is to be selected.

The resultant arrangement of coefficients obtained by the rearrangement memory 24 is shown as the above-mentioned block signal C (FIG. 3B) when the intra-frame orthogonal transformation is to be selected, while it is shown as a block signal C, (FIG. 3C) when the intra-field orthogonal transformation is to be selected. In response to the block signals C and C' different in arrangement, the vertical orthogonal transformation circuit 25 outputs block signals D (of FIG. 3B) (FIG. 3C) and D' respectively. Here, the butterfly operator of the vertical orthogonal transformation circuit 25 in this embodiment is similar to "the orthogonal transformation apparatus", and among the coefficients in a block signal D', therefore, the coefficients of $z_{ij}$ (i=1, ..., 4) are the result of the orthogonal transformation of degree 4 on the inter-field sum and the coefficients of $z_{ij}$ (i=5, ..., 8) are the result of the orthogonal transformation of degree 4 on the inter-field difference. In the coefficients, the smaller value of i shows a coefficient for a lower frequency component while the larger value of i shows a coefficient for a higher frequency component.

Next, the operation of the scanning circuit 30 will be described.

Figure 4:
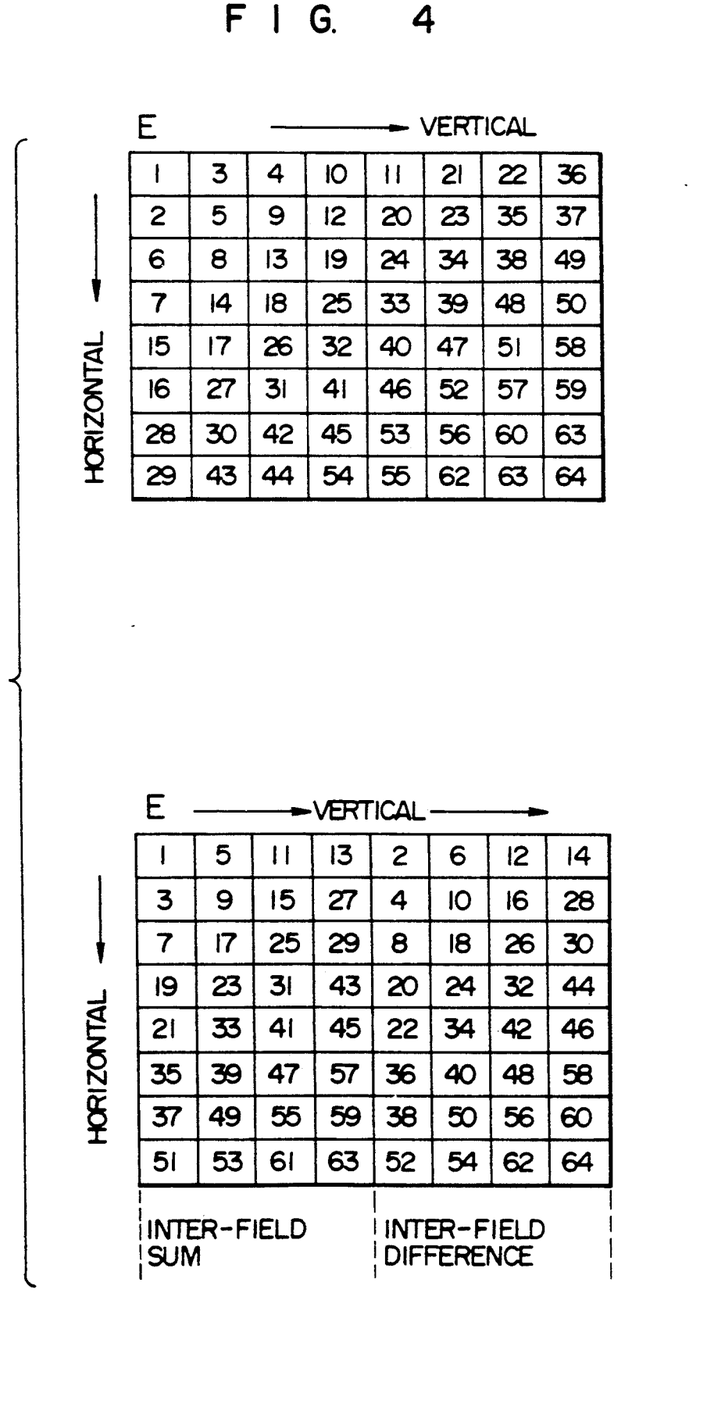

FIG. 4 is a diagram showing examples of the order of scanning for rearranging the orthogonal transformation coefficients (the block signals D of FIG. 3B and D' of FIG. 3C) of each of blocks for the purpose of explanation of the operation of the scanning circuit 30. The scanning order E in the drawing shows an example of the scanning order when the intra-frame orthogonal transformation formation is selected, corresponding to the block signal C of FIG. 3B. The scanning order E' in FIG. 4 shows an example of the scanning order when the intra-field orthogonal transformation is selected, corresponding to the block signal C' of FIG. 3C.

In the scanning order E, which is the scanning order for two-dimensional orthogonal transformation, the coefficients of the signal D are arranged in a two-dimensional frequency arrangement called zigzag scanning so that they are arranged in the order of from lower frequency components (vertical and horizontal lower frequency components in the left upper portions in the drawing) to higher frequency components (in the right lower portions). This is because lower frequency components, including a DC component, give larger influences on the visual sense than higher frequency components, and the lower frequency components are made to be more important components than the higher frequency components.

In the scanning order E', on the other hand, the arrangement is of the intra-field two-dimensional orthogonal transformation and inter-field sum and difference, that is, a kind of three-dimensional orthogonal transformation (inter-field sum and difference are one of orthogonal transformations in the direction of time). Therefore, in the scanning order E' for each of the inter-field two-dimensional orthogonal transformations, the coefficients are arranged in a two-dimensional frequency arrangement so as to be in the order of from lower frequency components to higher frequency components similarly to the above-mentioned scanning order E. However, the arrangement in the time direction is not such that the inter-field difference (high frequency components in the time direction) is arranged after all the inter-field sum (low frequency components in the time direction) has been arranged, but the inter-field sum and difference are alternately arranged for every coefficient of the intra-field two-dimensional orthogonal transformation. This is because the intra-field orthogonal transformation is selected when no inter-field correlation exists, that is, when the inter-field difference (high frequency components in the time direction) is large and it is therefore necessary to treat the interfield sum and difference at least to the same degree.

As described above, in this embodiment, selection between intra-frame and intra-field orthogonal transformations is determined in parallel to the operation for the horizontal orthogonal transformation, and two-dimensional orthogonal transformation of the intraframe and intra-field switching type can be realized by the rearrangement of coefficients by means of the reading address control circuit 245 of the rearrangement memory 24 on the basis of the result of the above-mentioned selection and the butterfly operator configuration of the vertical orthogonal transformation circuit 25 without much increasing the circuit scale. Moreover, even when either one of intra-frame orthogonal transformation and intra-field orthogonal transformation is selected, the block size is equal to each other between the two transformations and the orthogonal transformation coefficients are arranged in the order from a DC component to a higher frequency component. Consequently, it is not necessary at all to perform switching between the intra-frame and intra-field orthogonal transformations in the coding circuit 4 in the succeeding stage but the same processing can be performed. Accordingly, the effect of this embodiment is remarkable in practical use.

Figure 5:
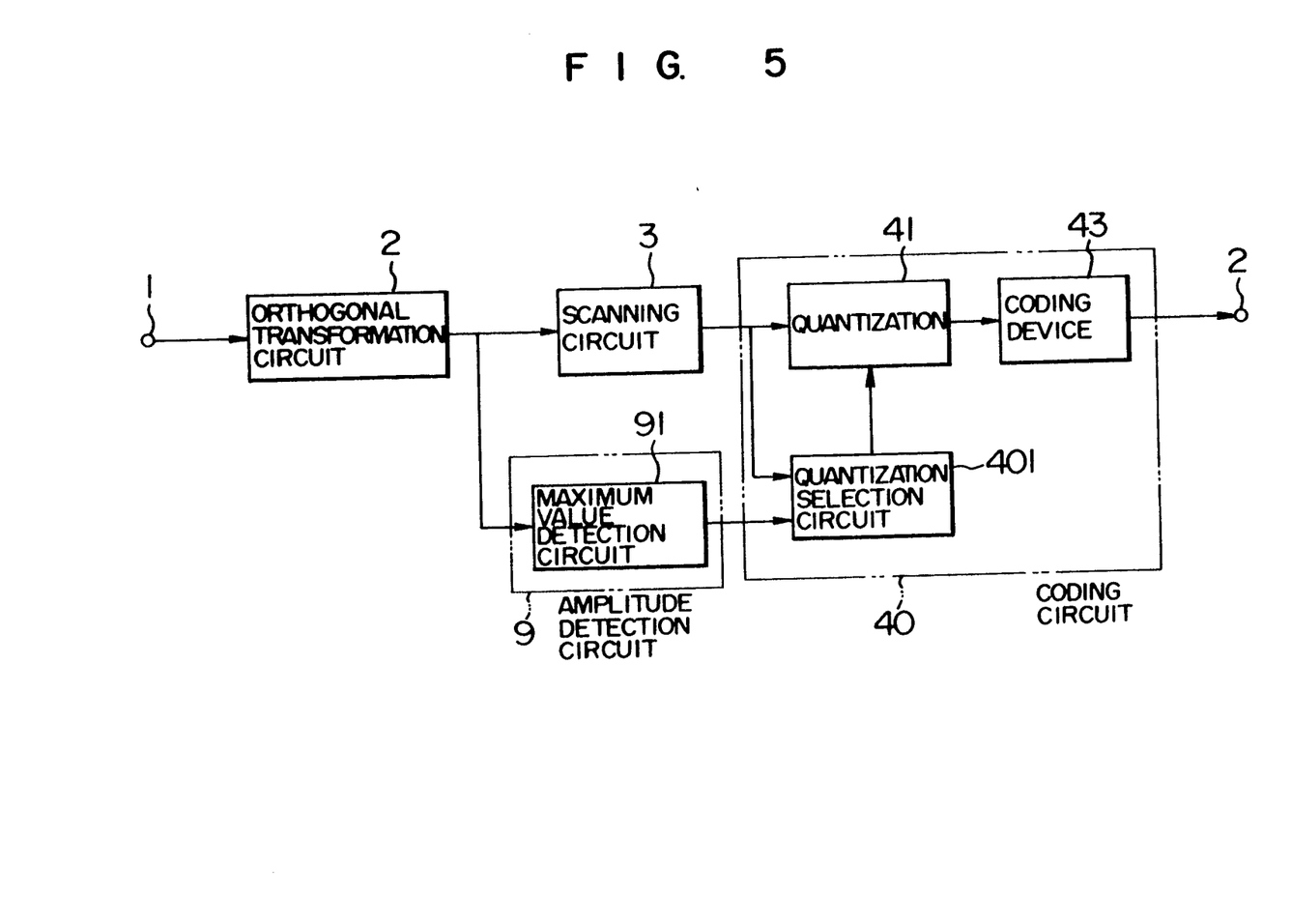
FIG. 5 is a block diagram showing the configuration of the orthogonal transformation encoder according to a second embodiment of the present invention.

FIG. 5 is a block diagram showing a second embodiment of the orthogonal transformation encoder according to the present invention. In the drawing, a signal supplied through an input terminal 1 is subjected to blocking in the same manner as in the foregoing first embodiment so as to have a block size of 8 pixels in the horizontal direction and also 8 pixels in the vertical direction, in every block. A block constituted by $8 \times 8$ pixels is subjected to two-dimensional orthogonal transformation in an orthogonal transformation circuit 2, and the arrangement of the transformation coefficients is rearranged so as to be in the order of from lower frequency components to higher frequency components in the two-dimensional frequency in a scanning circuit 3.

An amplitude detection circuit 9 is constituted by a maximum value detection circuit 91 for detecting the maximum amplitude value of the transformation coefficients in every block and for outputting the thus detected maximum amplitude value. The maximum amplitude value is sent to a coding circuit 40 in the succeeding stage as amplitude information of each block.

The coding circuit 40 is constituted by a quantizer 1 for quantizing, with a certain step width, the orthogonal transformation coefficients, a quantization selection circuit 401 for making selection so that the quantizer has a step width suitable for restricting the data quantity within a desired value, and a coding device 43 for coding the quantized data outputted from the quantizer 41. The output of the coding circuit 40 is sent to an output terminal 5. The quantization selection circuit 401 is arranged to perform selection so as to make the quantizer have a small quantizing step width on the basis of the maximum value of the transformation coefficients which is amplitude information obtained from the amplitude detection circuit 9 so that the rate of elimination of the transformation coefficients of a block containing only smaller-amplitude frequency components is reduced in comparison with a block containing larger-amplitude frequency components.

Figure 6:
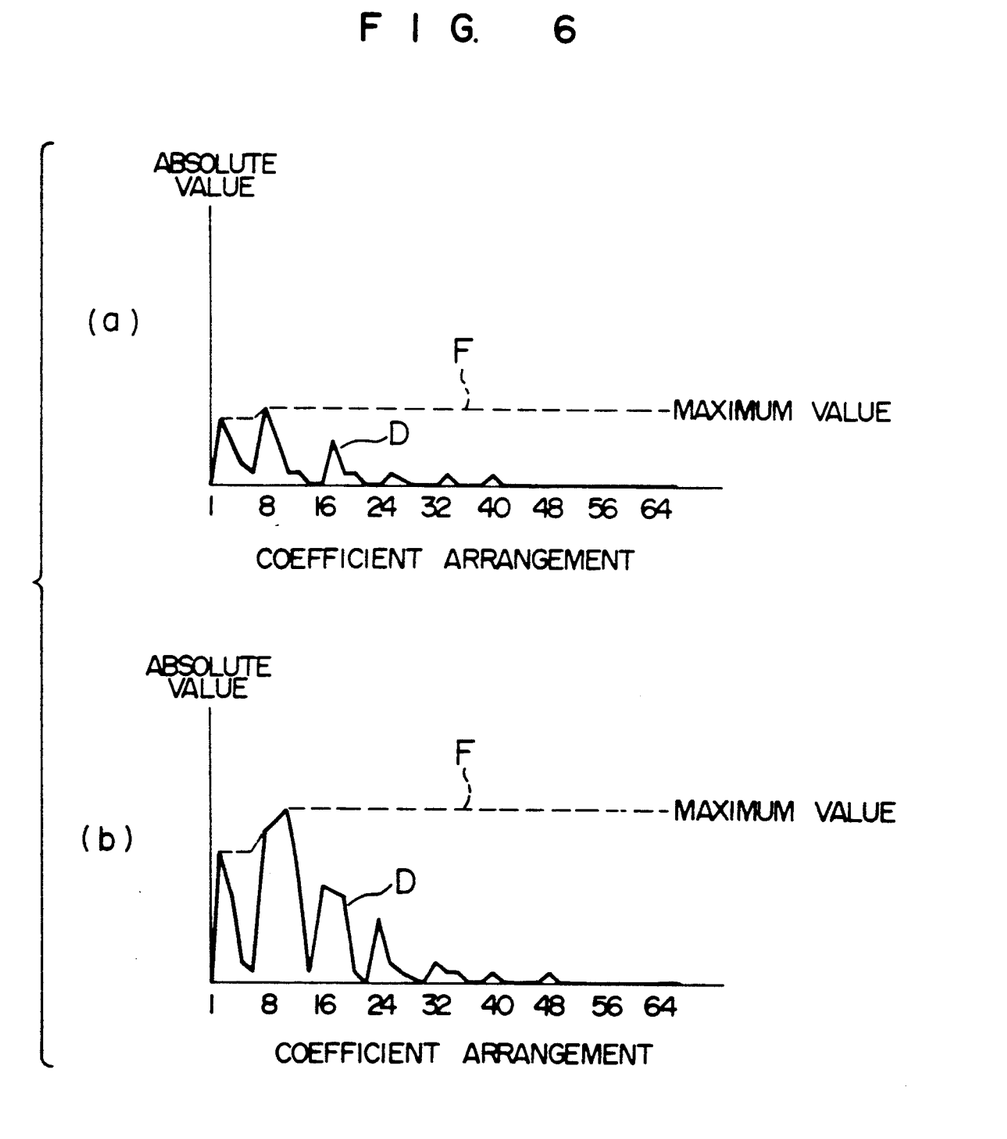
FIG. 6 is a view of signal arrangements among the constituent components for explaining the operation of the orthogonal transformation encoder according to the second embodiment of the present invention.

The operation of this embodiment having the foregoing configuration will be described with reference to FIG. 6 showing changes of the amplitude values of the transformation coefficients in a block.

The diagram (a) of FIG. 6 shows changes of the amplitude values of the transformation coefficients in a block containing frequency components having relatively smaller amplitude values, and, on the other hand, the diagram (b) of FIG. 6 shows changes of the amplitude values of the transformation coefficients in a block containing frequency components having relatively larger amplitude values. In the drawings, D represents changes in the output of the orthogonal transformation circuit 2, and F represents changes in the output of the maximum value detection circuit 91. Further, in each of the diagrams (a) and (b), the ordinate represents the amplitude value, that is, the absolute value of the transformation coefficient. The abscissa represents the order of the coefficients, that is, 64 transformation coefficients of the block signal D of FIG. 3B or D' of FIG. 3C are represented by 1-64. Here, although a transformation coefficient $z_{11}$ which is a DC component is inputted at the order 1 on the abscissa, the maximum value detection circuit 91 of this embodiment detects the maximum amplitude values of only the 63 transformation coefficients of AC components except the DC component. The value of zero is set as an initial value of a candidate value (referred to as a maximum value candidate) of the signal F at the timing when the DC component of the abscissa 1 is inputted. Subsequently, the maximum value candidate is compared with the absolute value of the transformation coefficient so as to renew the maximum value candidate. Upon the completion of comparison with the final transformation coefficient (the abscissa 64 in the drawing), the maximum value candidate is outputted as the maximum value of the transformation coefficients in the block.

As described above, in this embodiment, the maximum value of the coefficients (except the DC component) of every block obtained in the maximum value detection circuit 91 is sent to the quantization selection circuit 401 in the coding circuit 40 in the succeeding stage. Thus, the quantization selection circuit 401 can protect, on the basis of the maximum value of the transformation coefficient, the transformation coefficients of a block containing only small-amplitude frequency components so as not to relatively eliminate the transformation coefficients in comparison with a block containing large-amplitude frequency components so that the picture quality can be prevented from being deteriorated in a flat portion.

Although the maximum value detection circuit 91 may be provided in the quantization selection circuit 401, if the maximum value detection circuit 91 is provided in parallel to the scanning circuit 3 as shown in this embodiment, it is not necessary to make an increase in delay circuit or memory, and therefore the configuration is effective in circuit scale.

Further, the reason why a DC component is removed from an object for maximum value detection in the maximum value detection circuit 91 is that the DC component is an off-set, over the whole block, to the AC component constituted by other frequency components and is different from the amplitude values of the frequency components in question, and therefore the DC component does not relate to deterioration of the picture quality in a flat portion, which is a problem to be solved.

Figure 7:
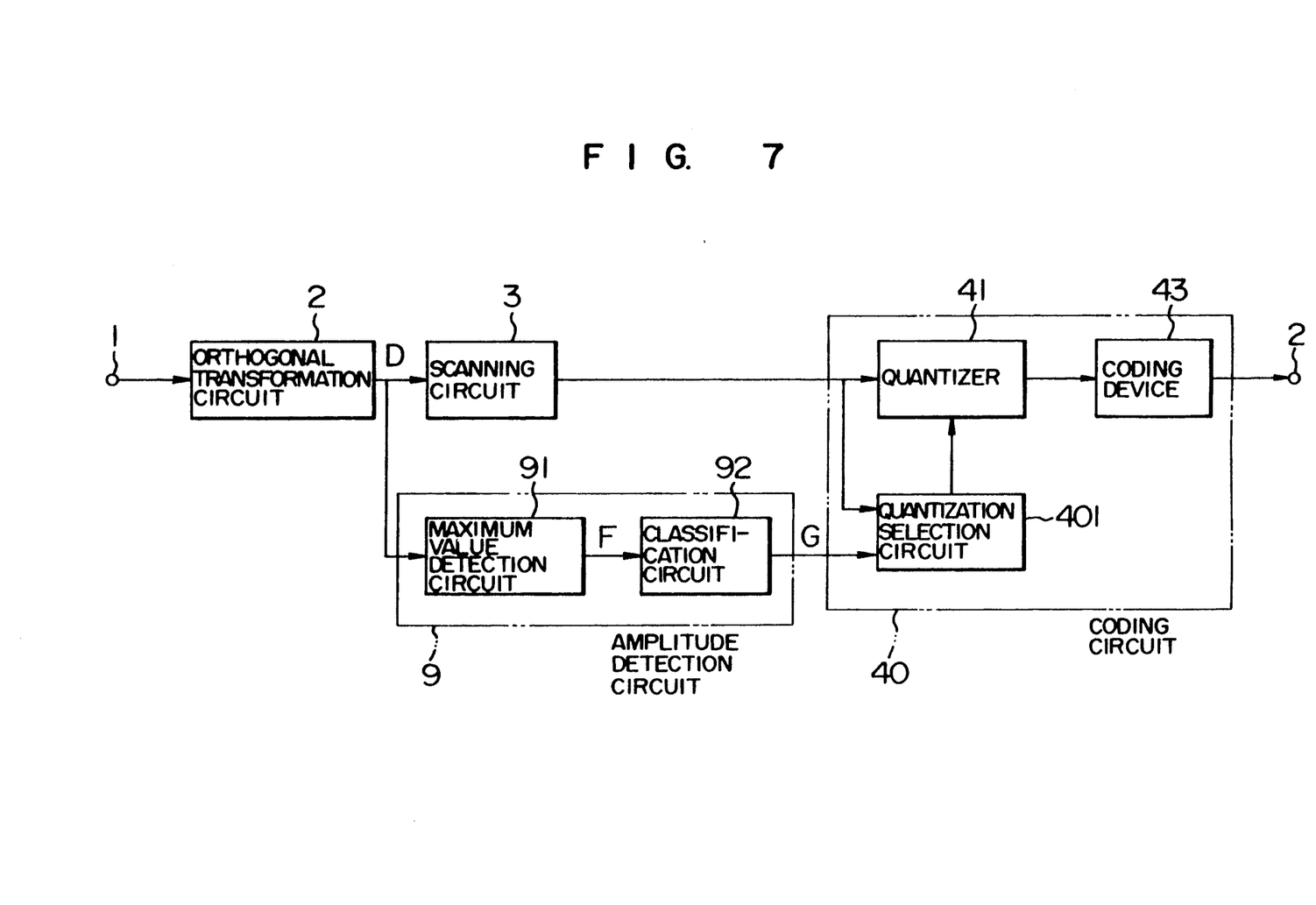
FIG. 7 is a block diagram showing the configuration of the orthogonal transformation encoder according to a third embodiment of the present invention.

Next, description will be made as to a third embodiment of orthogonal transformation encoder according to the present invention. This embodiment is different from the second embodiment in the configuration of an amplitude detection circuit 9. FIG. 7 is a block diagram showing a third embodiment of the present invention. In the drawing, the amplitude detection circuit 9 has a configuration in which a classification circuit 92 is provided immediately after a maximum value detection circuit 91.

Figure 8:
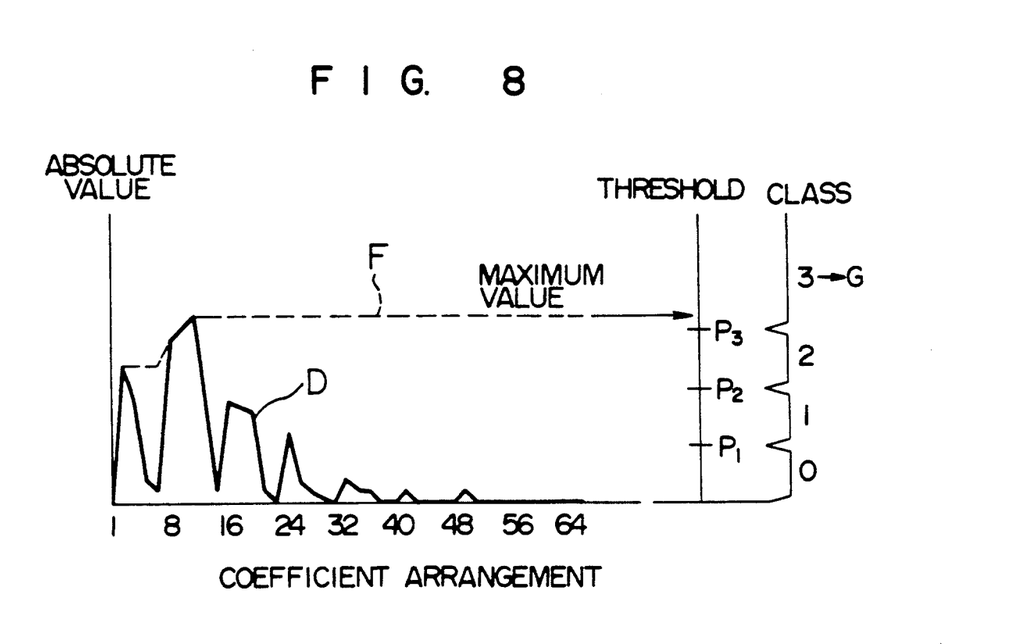
FIG. 8 is a view of signal arrangements among the constituent components for explaining the operation of the orthogonal transformation encoder according to the third embodiment of the present invention.

The operation of this embodiment will be described with reference to FIG. 8 showing changes of the transformation coefficients. In the drawing, the change D of the transformation coefficients outputted from an orthogonal transformation circuit 2 and the change F of the maximum value candidate obtained by the maximum value detection circuit 91 are the same as those of the first embodiment. The classification circuit 92 classifies the maximum amplitude values obtained from the maximum value detection circuit 91 into four kinds of classes by using three kinds of thresholds $P_1$, $P_2$, and $P_3$ as shown in FIG. 8. In the drawing, the four kinds of classes are numbered to be 0, 1, 2, and 3 in ascending order from a small absolute value of the transformation coefficient to a large one. In the case of the change D of the orthogonal transformation coefficients of FIG. 8, the maximum amplitude values are classified into the class 3 because the maximum values are larger than the threshold $P_2$. The values of this class 3 are sent to a coding circuit 40 in the succeeding stage as the amplitude information (G of FIG. 8) of the output of the amplitude detection circuit 9 so as to be used so that a quantization selection circuit 401 performs selection so as to make the quantizer have a different step width.

Although the maximum value of the orthogonal transformation coefficients is sent to the coding circuit 40 as it is in the second embodiment, the frequency components, having small amplitude values, which is a problem to be solved, are in a considerably limited range. That is, the influence is small between blocks in which the maximum value of the transformation coefficients is relatively large even if the step widths are the same between the blocks, and therefore the foregoing problem can be solved by detecting only transformation coefficients having a small maximum value. Therefore, in the quantization selecting function in the quantization selection circuit 401, it is not necessary that the number of bits is large enough to express all over the ranges which can be taken by the orthogonal transformation coefficients. In the case of classification into four kinds of classes as shown in this embodiment, it is sufficient that the number of bits is two.

As described above, in this embodiment, the effect to solve the problem is the same as that of the foregoing first embodiment, and further it will do to send the class obtained by classifying the maximum values of the transformation coefficients to the coding circuit 4. The number of bits of transmission may be therefore reduced, and the number of lines of the interface between ICs may be therefore reduced taking the actual circuit integration into consideration. Accordingly, it is more effective in that the number of pins of the IC may be reduced.

Figure 9:
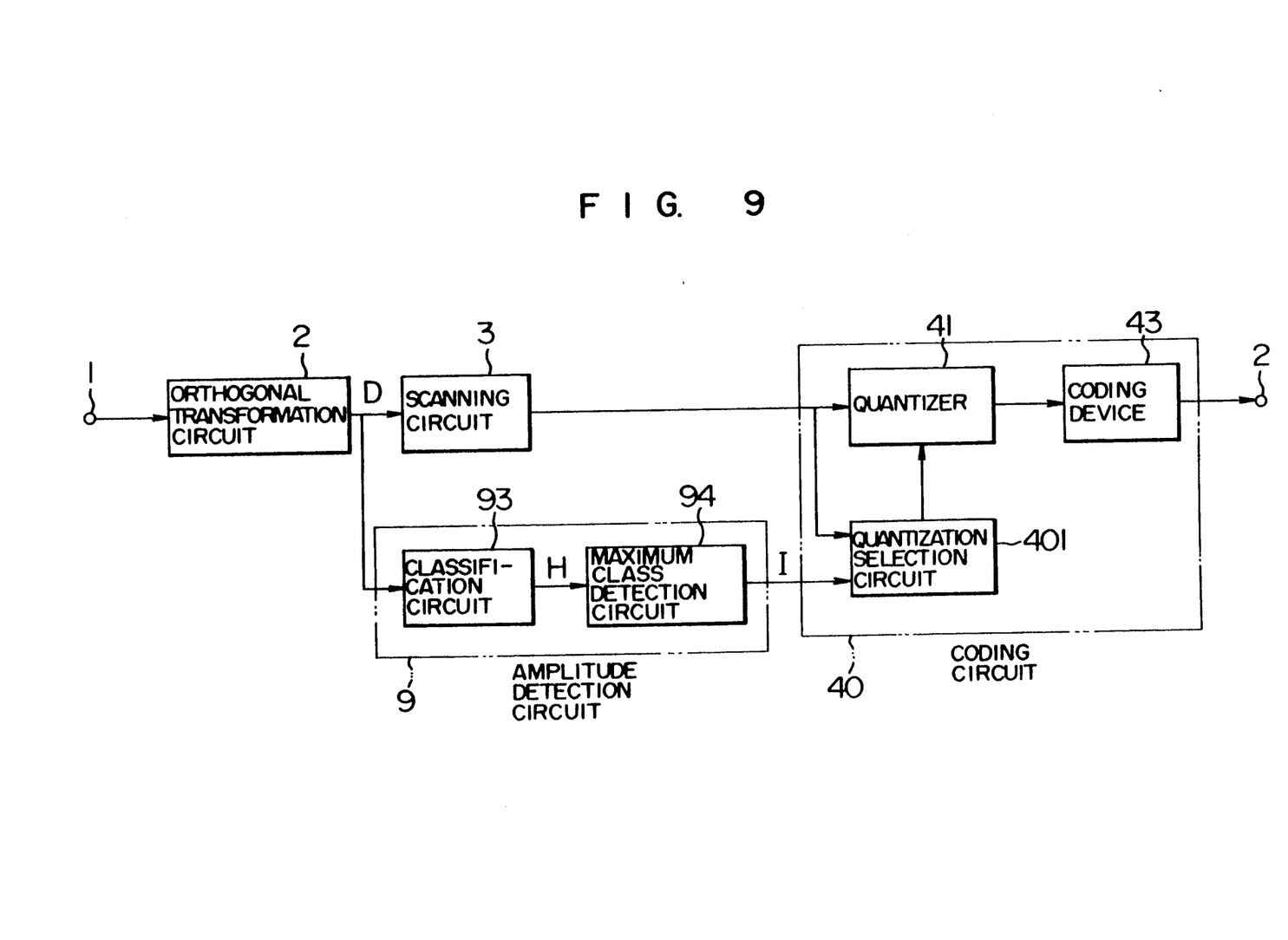
FIG. 9 is a block diagram showing the configuration of the orthogonal transformation encoder according to a fourth embodiment of the present invention.
Figure 10:
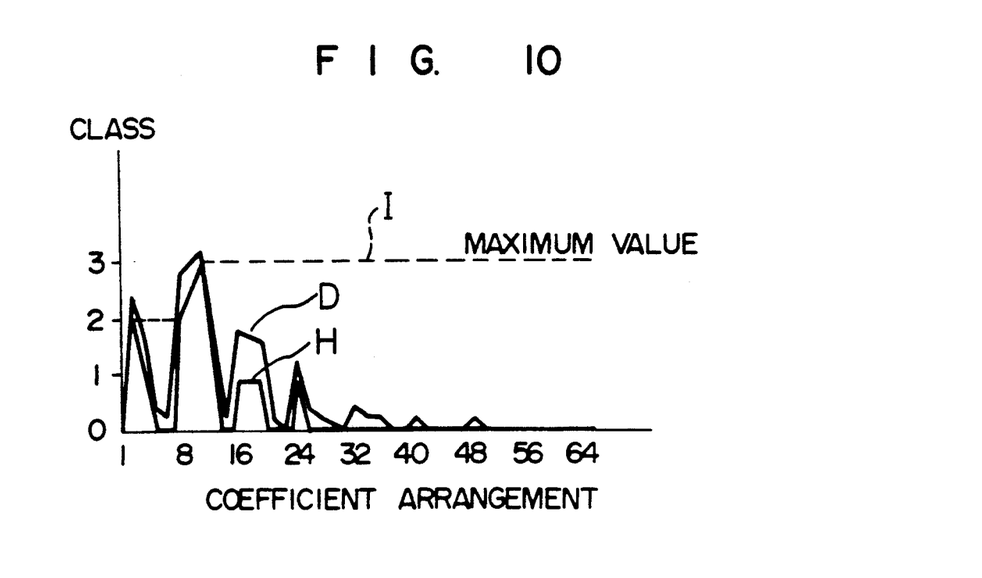
FIG. 10 is a view of signal arrangements among the constituent components for explaining the operation of the orthogonal transformation encoder according to the fourth embodiment of the present invention.

Next, a fourth embodiment of the present invention will be described. FIG. 9 is a block diagram showing a fourth embodiment of the orthogonal transformation encoder according to the present invention, and FIG. 10 is a diagram showing changes of the transformation coefficients. This embodiment is different from the second embodiment in the configuration of an amplitude detection circuit 9. The amplitude detection circuit 9 is constituted by a classification circuit 93 and a maximum class detection circuit 94.

The classification circuit 93 classifies the orthogonal transformation coefficients supplied to the amplitude detection circuit 9 into four kinds of classes by using three kinds of threshold values in the same manner as in the classification circuit 92 in the foregoing third embodiment. The four kinds of classes are numbered to be 0, 1, 2, and 3 in the ascending order from a small absolute value to a large one of the transformation coefficients. The change D of the orthogonal transformation coefficients of FIG. 9 becomes a class signal H in FIG. 10. Here, when a DC component at the abscissa 1 is inputted to the classification circuit 93, the class signal H is initialized to a class "0" showing the class having the smallest amplitude values.

Next, the maximum class detection circuit 94 detects the class corresponding to the maximum transformation coefficients on the basis of the class signal H. As a result, the class 3 is detected as a signal I of FIG. 10. At this time, if a large number is assigned to a class corresponding to a large transformation coefficient as shown in this embodiment, it is sufficient to obtain only the maximum value of the assigned number. This operation can be easily realized by the same function as the maximum value detection circuit 91 of the foregoing second and third embodiments. Further, the range (the class 0-3 correspond to two bits in this embodiment) which can be taken by the input classes is sufficiently narrower than the range (generally, 8 bits or more are required) which can be taken by the orthogonal transformation coefficients in comparison with the maximum value detection circuit 91, and therefore it is very effective in that a comparator for detecting the maximum class candidate (class signal H) and a register for storing the maximum class candidate itself may be reduced in size.

As described above, this embodiment is effective because the effect that the transformation coefficients of a block containing only small-amplitude frequency components is protected so as not to be relatively eliminated in comparison with a block containing large-amplitude frequency components to thereby prevent the picture quality from being deteriorated in a flat portion this the same as the effect of each of the foregoing second and third embodiments. Further, since the maximum class detection is performed after classification of the transformation coefficients, the circuit scale is so reduced that this embodiment is more practical than the second and third embodiments.

In the second, third, and fourth embodiments, description has been made as to the case where orthogonal transformation is made without using the intra-frame/intra-field switching type orthogonal transformation of the first embodiment. However, as to the output signal of the scanning circuit 30, the block size or the like is not different between intra-frame and intra-field orthogonal transformation and the DC component is one in each block. Further, in the second, third, and fourth embodiments, the operation of the amplitude detection circuit 9 is to detect the maximum amplitude (or maximum class) which is independent of the order of the coefficients in each block. From the above fact, the measure of the intra-frame/intra-field switching type orthogonal transformation of the first embodiment may be used in each of the second, third, and fourth embodiments, and in such a case, the use becomes more practical because the effects of the respective embodiments can be obtained.

What is claimed is:

1. An orthogonal transformation encoder comprising:
   a first orthogonal transformation circuit supplied with a blocking signal of a video signal by frame, and for performing orthogonal transformation on said blocking signal in the horizontal direction;
   an inter-field-correlation detection circuit provided in parallel to said first orthogonal transformation circuit, and for detecting correlation between two fields included in said blocking signal;
   a rearrangement memory for rearranging an output of said first orthogonal transformation circuit, in the vertical direction;
   a second orthogonal transformation circuit for performing orthogonal transformation, in the vertical direction, on the output blocking signal from said rearrangement memory; and
   wherein intra-frame orthogonal transformation is performed by means of said rearrangement memory and said second orthogonal transformation circuit when said inter-field correlation detection circuit detects that said blocking signal has large inter-field correlation, while intra-field orthogonal transformation is performed by means of said rearrangement memory and said second orthogonal transformation circuit when said inter-field correlation detection circuit detects that said blocking signal has small inter-field correlation.

2. An orthogonal transformation encoder according to claim 1, in which said rearrangement memory rearranges the output of said first orthogonal transformation circuit in the vertical direction by frame in a state of interlace when said inter-field correlation is large while said rearrangement memory rearranges the output of said first orthogonal transformation circuit in the vertical direction by field in a state of separation when said inter-field correlation is small, and
   in which said second orthogonal transformation circuit switches inside butterfly operation so as to perform intra-frame orthogonal transformation when said inter-field correlation is large while perform orthogonal transformation on each of an inter-filed sum and an inter-field difference.

3. An orthogonal transformation encoder for orthogonally transforming and coding a video signal, comprising:
   a scanning means for rearranging orthogonally transformed transformation coefficients so as to be suitable for coding;
   an amplitude detection means provided in parallel to said scanning means, and for detecting amplitude values of said transformation coefficients; and
   a coding means for quantizing and coding the transformation coefficients obtained from said scanning means on the basis of amplitude information obtained from said amplitude detection means.

4. An orthogonal transformation encoder according to claim 3,
   in which said amplitude detection means is constituted by a maximum value detection means for detecting a maximum amplitude value of said transformation coefficients by block subjected to orthogonal transformation, the maximum amplitude value being used as said amplitude information; and
   in which said coding means performs quantization and coding on said transformation coefficients on the basis of said maximum amplitude value as the amplitude information obtained from said amplitude detection means so that the smaller the maximum amplitude value of the block the smaller the quantizing step width.

5. An orthogonal transformation encoder according to claim 3, in which said amplitude detection means is constituted by a maximum value detection means for detecting a maximum amplitude value of said transformation coefficients by block subjected to orthogonal transformation, and a classification means for classifying the maximum amplitude values obtained by said maximum value detection means into a predetermined number of classes on the basis of a plurality of threshold values, said classes being used as said amplitude information; and in which said coding means performs quantization and coding on said transformation coefficients on the basis of said classes as the amplitude information obtained from said amplitude detection means so that the smaller the maximum amplitude value of the block the smaller the quantizing step width.

6. An orthogonal transformation encoder according to claim 3, in which said amplitude detection means is constituted by a classification means for classifying amplitude values of said transformation coefficients by block subjected to orthogonal transformation on the basis of a plurality of threshold values into a predetermined number of classes on the basis of a plurality of threshold values, and a maximum class detection means for detecting a maximum class showing the largest amplitude values of the classes of said by said transformation coefficients, said maximum class being used as said amplitude information; and in which said coding means performs quantization and coding on said transformation coefficients on the basis of said maximum class as the amplitude information obtained from said amplitude detection means so that the smaller the maximum amplitude value of the block the smaller the quantizing step width.

* * * * *